(12) United States Patent
Bury

(10) Patent No.: US 10,502,247 B2
(45) Date of Patent: Dec. 10, 2019

(54) HOLDER SYSTEM FOR AN ELECTRONIC APPARATUS

(71) Applicant: Bury Sp.z.o.o., Mielec (PL)

(72) Inventor: Henryk Bury, Loehne (DE)

(73) Assignee: BURY SP.Z.O.O., Mielic (PL)

( * ) Notice: Subject to any disclaimer, the term of this patent is extended or adjusted under 35 U.S.C. 154(b) by 129 days.

(21) Appl. No.: 15/695,055

(22) Filed: Sep. 5, 2017

(65) Prior Publication Data
US 2018/0066683 A1 Mar. 8, 2018

(30) Foreign Application Priority Data
Sep. 5, 2016 (DE) .......... 10 2016 116 580

(51) Int. Cl.
*H04M 1/04* (2006.01)
*B60R 11/02* (2006.01)
(Continued)

(52) U.S. Cl.
CPC ............... *F16B 1/00* (2013.01); *B60R 11/02* (2013.01); *F16M 13/022* (2013.01); *B60R 11/0241* (2013.01); *B60R 2011/007* (2013.01); *B60R 2011/0057* (2013.01); *B60R 2011/0061* (2013.01); *B60R 2011/0071* (2013.01); *B60R 2011/0078* (2013.01); *F16B 2001/0035* (2013.01); *H04M 1/04* (2013.01)

(58) Field of Classification Search
CPC ................ B60R 11/00; B60R 11/0241; B60R 2011/0003; B60R 2011/0057; B60R 2011/0061; B60R 2011/0063; B60R 2011/0071; B60R 2011/75; B60R 2011/0078; F16B 2001/0035; F16M 13/022; H04M 1/04
See application file for complete search history.

(56) References Cited

U.S. PATENT DOCUMENTS 6,305,588 B1 * 10/2001 Michel ...................... A45F 5/02
224/195
7,374,142 B2 * 5/2008 Carnevali .............. F16M 13/00
224/183

(Continued)

FOREIGN PATENT DOCUMENTS

DE          10206310 A1    8/2002
DE    10 2004 062 178 B4   10/2007
(Continued)

*Primary Examiner* — Tan Le
(74) *Attorney, Agent, or Firm* — W&C IP

(57) ABSTRACT

A holder system for an electronic apparatus (46), having a holding piece (20), provided for fastening in a locationally fixed manner, and a mounting (40) that is connectable to the holding piece (20) and to which the electronic apparatus (46) is releasably fastenable is characterized in that the holding piece (20) on a fastening plate (29), and the mounting (40) on a rear wall (41), have fastening elements (52), (53) which by means of a rotating movement of less than 180° are conjointly movable from an initial position to a latching position, and in that magnets (50), (51) or ferromagnetic pieces are inserted into the fastening plate (29), on the one hand, and into the rear wall (41), on the other hand, such that an increasing magnetic pull is present from a placing position to the latching position.

4 Claims, 12 Drawing Sheets

(51) Int. Cl.
*F16M 13/04* (2006.01)
*F16M 11/24* (2006.01)
*F16B 1/00* (2006.01)
*F16M 13/02* (2006.01)
*B60R 11/00* (2006.01)

(56) References Cited

U.S. PATENT DOCUMENTS

| | | | | |
|---|---|---|---|---|
| 9,689,527 B2* | 6/2017 | Franklin | ................ | F16M 13/02 |
| 9,821,724 B2* | 11/2017 | Zhang | .................. | F16M 11/105 |
| 9,845,058 B2* | 12/2017 | Chow | ..................... | B60R 11/02 |
| 2004/0188576 A1* | 9/2004 | Carnevali | ............. | F16M 13/00 |
| | | | | 248/206.5 |
| 2013/0221189 A1 | 8/2013 | Kubin | | |
| 2016/0150861 A1 | 6/2016 | Yao et al. | | |

FOREIGN PATENT DOCUMENTS

| | | | | |
|---|---|---|---|---|
| DE | 102005044946 B4 | 6/2009 | | |
| DE | 102016111448 A1 * | 12/2017 | ............. | B60R 11/00 |
| EP | 1266456 A1 | 12/2002 | | |

* cited by examiner

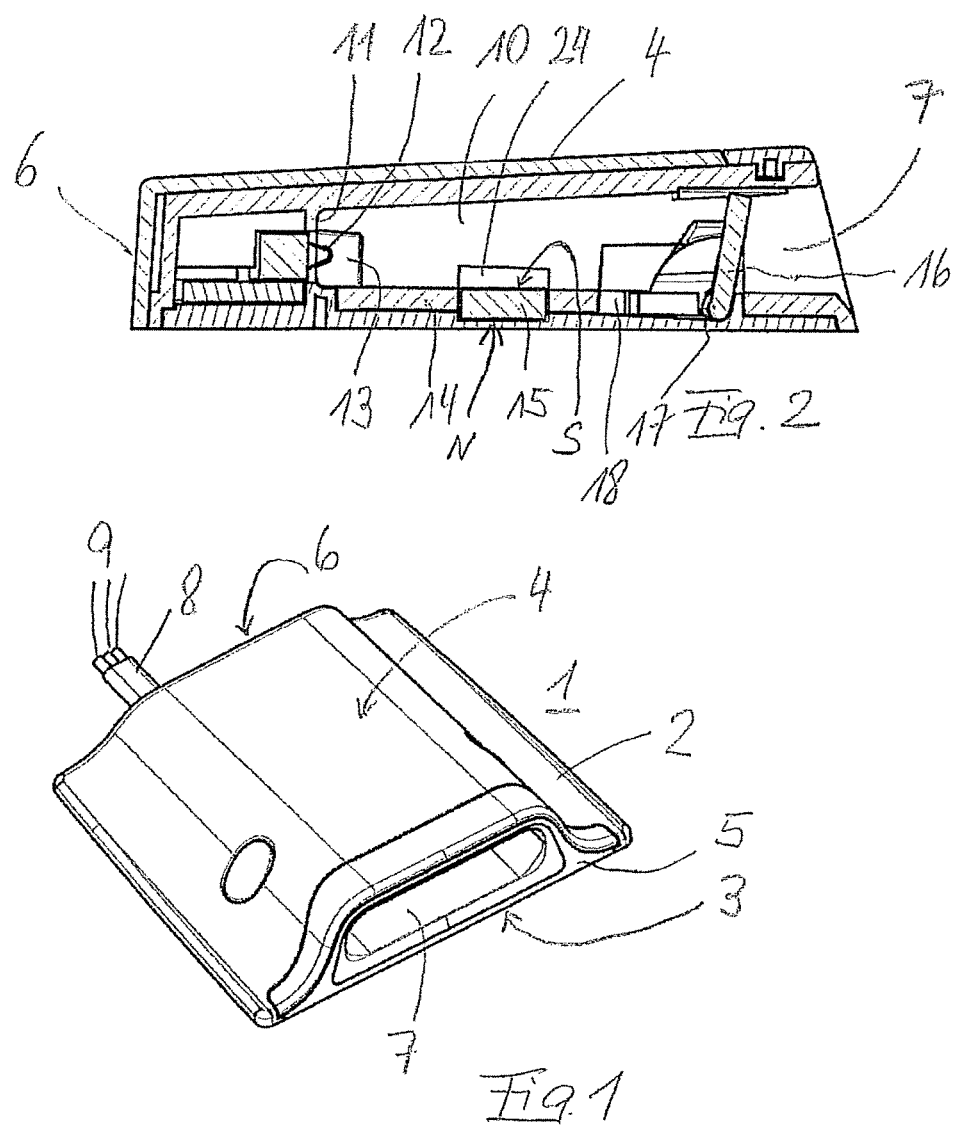

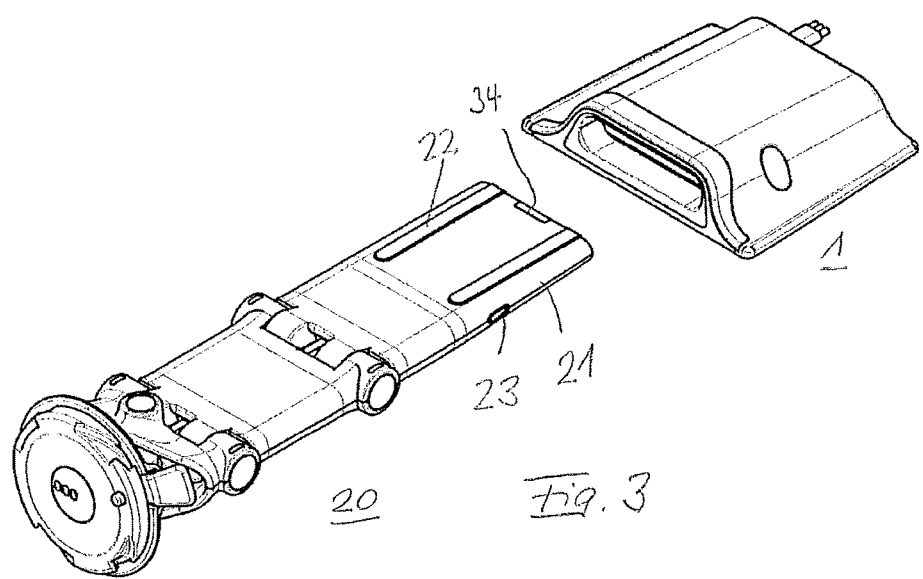

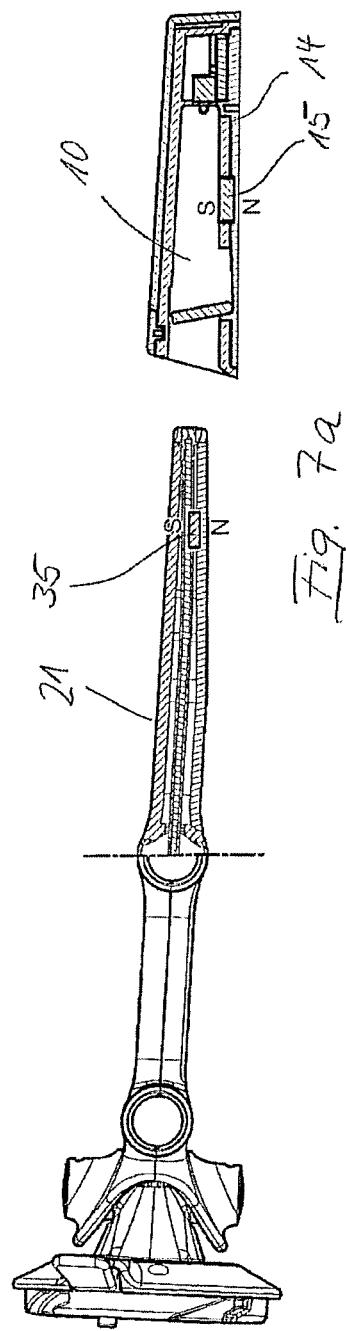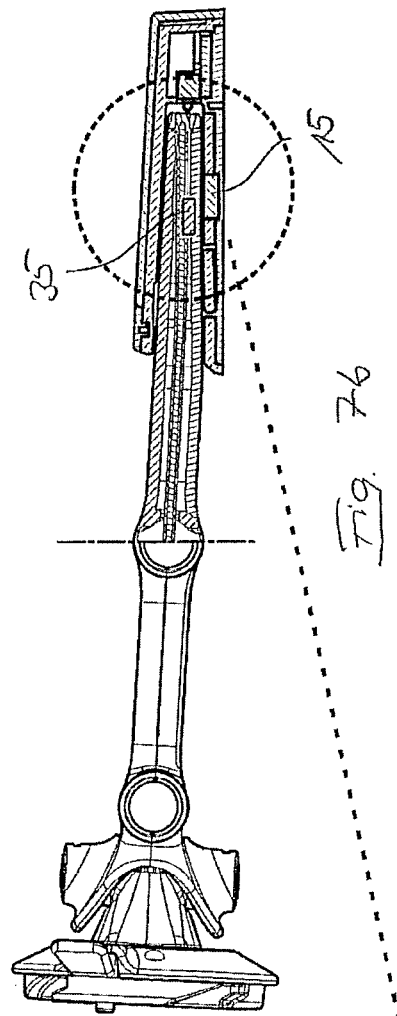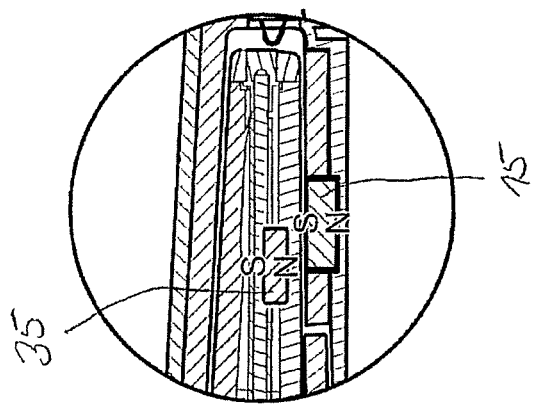

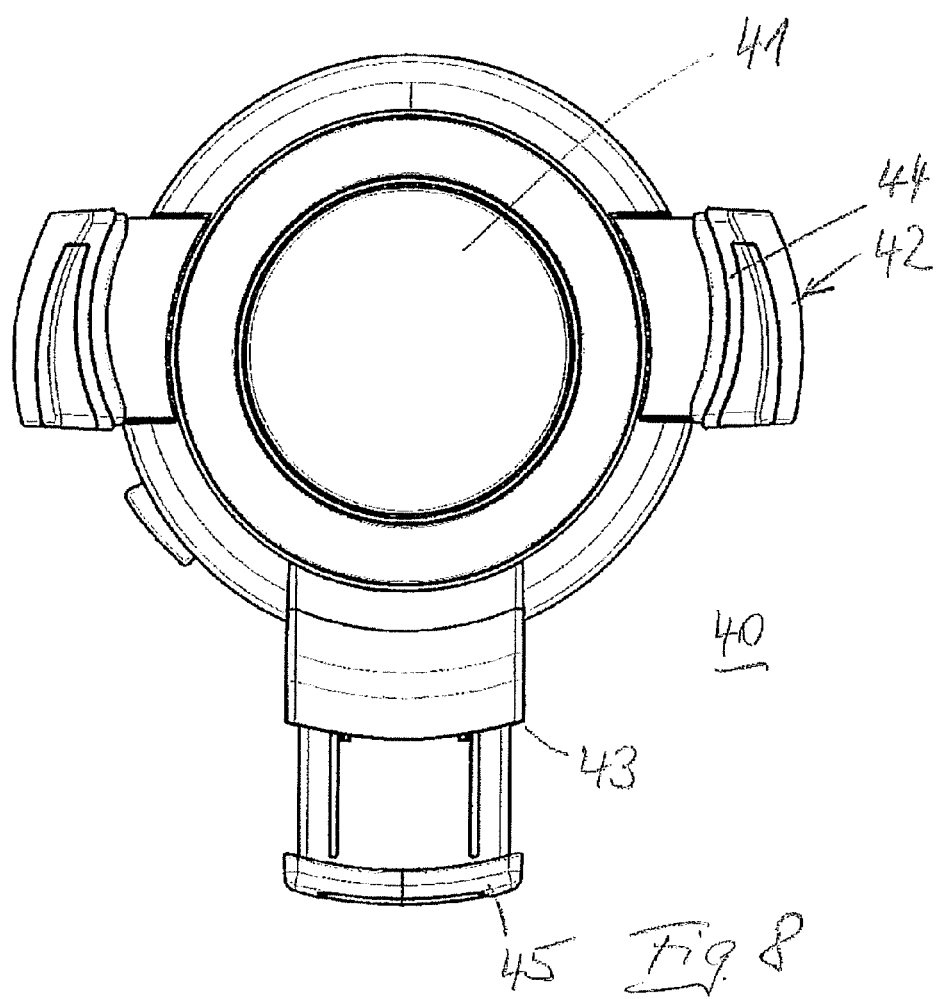

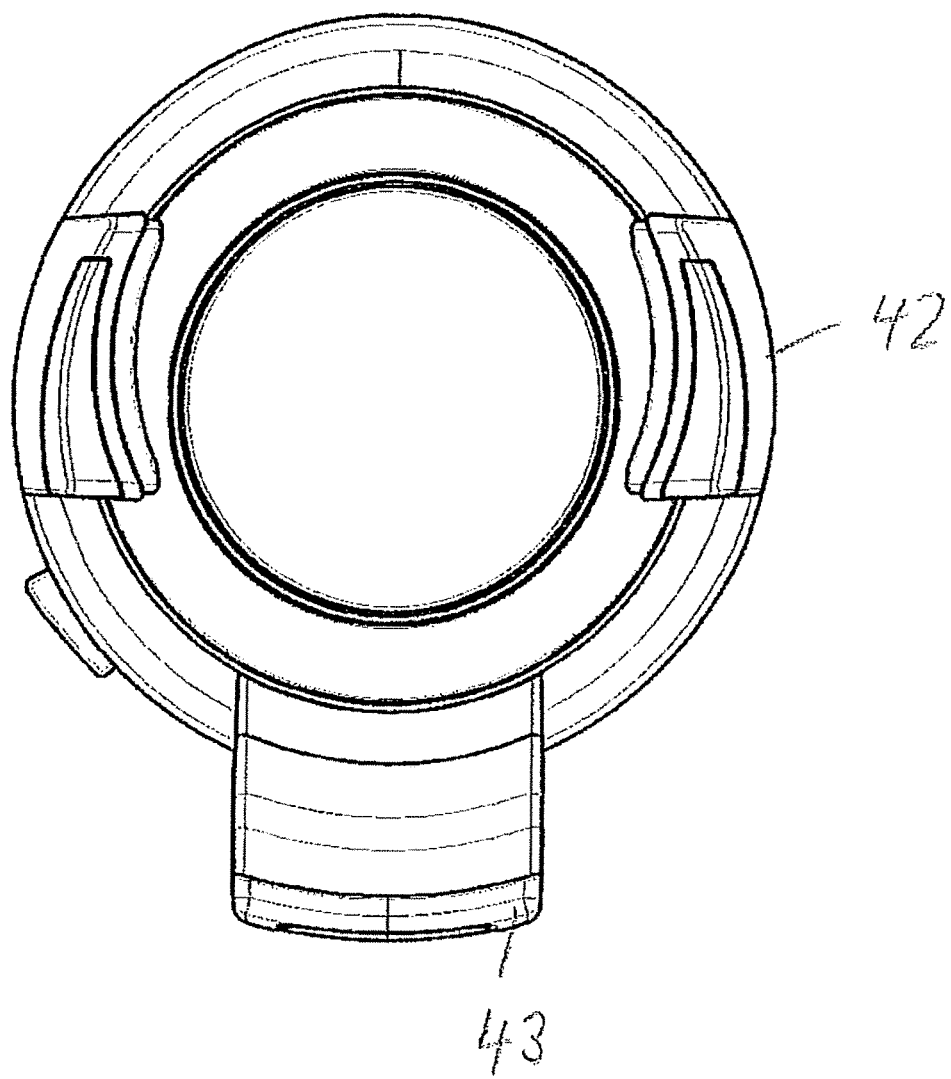

HOLDER SYSTEM FOR AN ELECTRONIC APPARATUS

The invention relates to a holder system for an electronic apparatus, having a holding piece provided for fastening in a locationally fixed manner, and a mounting that is connectable to the holding piece and in which the electronic apparatus is releasably fastened.

Numerous holder systems by way of which a telecommunications apparatus, in particular a telecommunications apparatus that is suitable for handling phone calls, is fastenable in a vehicle in order to be able to handle phone calls without having to take one hand from the steering wheel, for example, are known. It has proven successful herein for a receptacle part which can be placed in as inconspicuous a manner as possible in the vehicle and does not impede the esthetic appeal of the interior specification of the vehicle, when there is no mounting and no telecommunications apparatus fastened to the receptacle part, to be provided.

Apart from the task of mechanically holding the telecommunications apparatus, the mounting can further fulfill the task of supplying the telecommunications apparatus inserted thereinto with power such that the telecommunications apparatus in the state when inserted into the mounting does not consume any electrical energy from its own chargeable battery and the latter moreover can be charged by the electrical system of the vehicle.

A known system such as is described in EP 1 266 456 B1, for example, has a receptacle part into which a mounting is plug-fittable, wherein contact points of the mounting come into contact with contact points of the receptacle part when the mounting is plugged in, so as to in this manner transmit a supply voltage and optionally further electrical signals to the mounting. The mounting herein in mechanical and electrical terms is adapted to a specific type of apparatus, so as to take into account that different types of telecommunications apparatuses have both different mechanical dimensions as well as electrical connections in different positions and embodiments.

By virtue of the fact that telecommunications apparatuses nowadays are able to transmit almost all of the electrical signals thereof in a wireless manner in a near field, such as by way of Bluetooth signals, for example, the required contact capability of the mounting in relation to the receptacle part has been reduced to the transmission of the supply voltage (cf. DE 10 2005 044 946 B4). In many cases, only a switching signal, by way of which the line of the supply voltage to the mounting is actuated only depending on a position of the ignition lock, or depending on the detection of the starting ability of the vehicle by virtue of an access code, respectively, is additionally transmitted, so as to avoid any inadvertent discharge of the vehicle battery in the absence of the driver, in particular in a case where the vehicle is parked for a long time. Alternatively, it is of course possible for a terminal of the supply DC voltage that does not form the ground terminal to be connected to the receptacle part and consequently to the mounting by way of a respective switch.

The known system has resulted in that the installation in the vehicle could remain without modification when another telecommunications apparatus was to be used. This situation had to be taken into account because the duration of ownership of telecommunications apparatuses by a user is known to be often very short, since new telecommunications apparatuses having increasingly more functions and possibilities are being developed all the time and enter the market in short temporal intervals. In this case, it was necessary for only a matching mounting to be procured for the new telecommunications apparatus, since the connection between the mounting and the receptacle part was always the same in the case of this system.

This holder system has proven to be successful and has brought with it numerous advancements. An installed and visible receptacle part for the holder can be perceived to be annoying in particular with a view to the design of the interiors of the vehicles, in particular of passenger motor vehicles. This applies in particular for receptacle parts into which a holder for the electronic apparatus has to be plug-fitted, since a receptacle part of this type by necessity has to be configured so as to be relatively voluminous.

Furthermore, telecommunications apparatuses which are inductively chargeable no longer by way of a cable connection but by way of an induction coil have been known and on the market for some time. The mounting that is adapted to the respective telecommunications apparatus herein had a respective induction coil which is positioned such that the latter for charging can interact with the induction coil of the telecommunications apparatus with the highest possible efficiency. It has been attempted in the past to avoid the complexity of a mounting that is especially adapted to the telecommunications apparatus in that a mounting having adjustable holding arms has been used, so that telecommunication apparatuses of different sizes can be received by the mounting once the holding arms have been correspondingly adjusted. However, these apparatuses typically have not enabled any electrical connection and therefore have served primarily as a mechanical mounting. To the extent that the chargeable battery of the telecommunications apparatus was to be charged in the mounting, a separate electrical connection, for example by means of a suitable charging cable, was provided, to which end an adapter that fits into a cigarette lighter would usually be used. Since a solution of this type no longer meets modern requirements, a mounting of this type can no longer be considered for relatively sophisticated solutions. DE 10 2004 062 178 B4 provides a charging cable connection between the receptacle part and the mounting.

The present invention is based on the object of configuring a holder system of the type mentioned at the outset such that said holder system in terms of the fixedly installed parts can be designed in an overall smaller and less conspicuous manner, but that good manageability is nevertheless guaranteed.

This object is achieved by a holder system of the type mentioned at the outset in that the holding piece on a fastening plate, and the mounting on a rear wall, have fastening elements which by means of a rotating movement and by less than 180° are conjointly movable from an initial position to a latching position, and in that magnetic or ferromagnetic pieces are inserted into the fastening plate, on the one hand, and into the rear wall, on the other hand, such that an increasing magnetic pull is present from the initial position to the latching position. Since the fastening of the holder to the holding piece is performed only by way of a rotating movement of the type of a bayonet closure, the fastening plate of the holding piece can be designed so as to be relatively small and inconspicuous. Said fastening plate has to have only a minimum size which enables a stable mechanical fastening. In the desirable and relatively small design embodiment of the fastening plate a comparatively high level of care is required in principle in order for the mounting to be placed on the holding piece so as to mutually align the fastening elements such that a transition to the latching position is possible. In order for the handling in the case of the relatively small configuration of the holder system to be simplified, it is provided according to the invention that magnetic or ferromagnetic pieces are inserted into the fastening plate of the holding piece, on the one hand, and into the rear wall of the holder, on the other hand, such that an increasing magnetic pull is present from the placing position to the latching position. This leads to the holder being aligned relative to the holding piece by the magnetic effect already when the holder approaches the holding piece, such that no particular attention has to be paid by the operator in order for the correct introduction of the holder to the latching position to be carried out. By way of this measure it is achieved that the handling of the holder system is improved even in the case of a fastening plate of the holding piece that is configured so as to be only small.

In one preferred embodiment of the invention, in each case two permanent magnets are inserted into the rear wall of the mounting as well as into the fastening plate of the holding piece such that said permanent magnets in the latching position are in each case opposite one another. This is possible only when unlike poles of the mutually opposite permanent magnets point toward one another.

However, it is also possible for two permanent magnets to interact with two ferromagnetic plates of a corresponding size, the latter thus being pulled in the direction toward the permanent magnets and to the latching position. However, on account of the use of permanent magnets in the rear wall of the mounting as well as in the fastening plate of the holding piece, significantly improved guiding and enhanced pulling power in the direction toward the latching position is effected.

According to the invention, it is however provided that the holder and the holding piece are not only connected to one another by way of the magnetic effect but that the magnetic effect merely supports and facilitates the mechanical fastening of the holder to the holding piece. In a simple and readily manageable embodiment, a bayonet guide for the rotating movement is provided between the holding piece and the mounting. The fastening elements are thus appendages which are guided on a ramp to the latching position and thus form a bayonet closure.

The holding piece according to the invention can be located on an arm which by way of an appendage is push-fittable in a receptacle part which can be configured as a small flat housing in which a wide receptacle duct having a minor height is formed. The correspondingly formed appendage in the push-fitted state can be securable in the receptacle duct such that a mechanically stable mounting is guaranteed in this way.

Alternatively thereto, the holding piece can also be configured on a clamp-type mounting. It is expedient in all cases that the holding piece is pivotable about at least one, preferably about two rotation axes that are mutually perpendicular, in order for any display or an operating interface of the electronic apparatus to be moved to an easily identifiable or easily reachable position.

A simple and optionally retrofitting fastening potential results when the holding piece is configured on a clamp-type mounting. The configuration of the fastening plate of the holding piece on an arm enables a good positioning capability of the holder and thus of the electronic apparatus that is held in the holder when the arm has at least two mutually parallel rotation axes such that the position capability in one degree of freedom is the result of a corresponding Z-shaped configuration of the arm. A further rotation axis that is perpendicular thereto can of course be provided thereabove.

When an appendage of the fastening piece in the push-fitted state is securable in a receptacle duct of a receptacle part, a mechanically stable mounting is guaranteed in this way. Securing the appendage in the receptacle duct can be performed within the receptacle duct such that only the flat housing of the receptacle part without any locking elements is externally visible. The receptacle part can be configured so as to be universal, because this enable a connection to different appendages which can be associated with different holding pieces. The configuration of a receptacle duct in the receptacle part enables stable guiding of a matching appendage and stable locking of the appendage, or of the apparatus that is provided with the appendage, respectively, said locking not being unintentionally released by way of usual vehicle movements. By virtue of the universal configuration of the receptacle part, the latter is also suitable for receiving other electronic apparatuses which are not telecommunications apparatuses, for example air fresheners, flashlights, or the like.

In one preferred embodiment, at least one magnet is disposed in at least one delimitation of the receptacle duct such that magnetic poles that are effective in the push-fitting direction are created. Magnetic poles which in the correct alignment of the appendage in the receptacle duct pull the appendage into a secured position in the receptacle duct and in the incorrect alignment impede the attainment of the secured position are configured in a corresponding manner in the appendage.

The appendage can therefore be completely push-fitted and secured in the receptacle part only when the appendage is push-fitted into the entry opening so as to be correctly aligned in an intended manner. This is of particular significance when an electrical connection which must not be performed with reversed poles, such as is the case with a DC voltage supply in a vehicle, is established between the receptacle part and the appendage. The magnetic poles prevent any unintended alignment of the appendage in the receptacle duct and thus any reversed poles on an apparatus, in particular a telecommunications apparatus, to be connected, thus enabling a configuration of the appendage without any annoying mechanical coding such that the appendage can also be configured in a visually appealing manner with a smooth surface which does not entail any risk of contamination on account of corners and shoulders that are difficult to clean. Moreover, a very pleasant feeling in handling is achieved by the magnetic poles, since the magnetic poles pull the appendage and the apparatus connected thereto into the receptacle duct and to the secured position and thus impart a comfortable feeling in handling to the user. The user no longer needs to overcome a latching mechanism using a force that is controlled as far as possible, as is the case with previous systems, and by way of a respective noise determine whether the locking has been performed in the correct manner in the receptacle part. Rather, according to the invention, a feeling of automation is imparted to the user when the appendage that has been correctly inserted is pulled into the secured position thereof with the aid of the magnetic force.

Mechanical latching from which the appendage can be extracted again only using a specific pulling force is preferably performed in the secured position. In this way, the securing of the appendage in the receptacle duct is additionally ensured. On account thereof, it becomes possible for the drawing force that is caused by the magnetic poles to act on the appendage to be dosed in a manner that is suitable for handling, without having to already apply the entire securing force for the appendage in the receptacle duct by the magnetic poles alone.

It is particularly preferable when the holder system also enables a transmission of electrical power, in particular for charging a telecommunications apparatus, a chargeable battery of a flashlight, a power charging unit, or the like. To this end, the receptacle part in one preferred embodiment of the invention is connectable to electrical connector lines, and said receptacle part has connector contact points in an end wall of the receptacle duct. In a manner matching the latter, the appendage is provided with contact elements that in the secured position contact the connector contact points and lines connected thereto for supplying electrical potentials to the mounting. The positioning of the appendage in the receptacle duct according to the invention herein ensures that the contact elements of the appendage establish electrical contact with the connector contact points of the receptacle part such that the supply voltage is transmittable in this way from the receptacle part to the appendage, for example. A respective transmission of the supply voltage to the mounting is effected by the appendage.

In order for a short circuit by way of conducting foreign matter that makes its way into the receptacle duct to be prevented, it can be provided in one embodiment of the invention that the end wall of the receptacle duct is provided with at least one protrusion beside the connector contact points. A coin, for example, that makes its way into the receptacle duct in this instance is not able to touch the connector contact points and to interconnect the latter so as to cause a short circuit. Accordingly, an electrical connection takes place only by way of the appendage which on the free end side thereof has at least one corresponding clearance which in the push-fitted state receives the protrusion.

In one embodiment of the invention, the receptacle duct in the region of the slot-shaped entry opening has a width that is at least double the height. It is furthermore preferable for the height to decrease as the distance from the entry opening increases. Accordingly, the appendage toward the free end thereof has an identical reduction in height. This reduction in height can be performed in step-shaped manner. In one embodiment of the invention, the reduction in height takes place in a steady manner such that the appendage in terms of the height thereof is configured so as to taper in a conical manner.

The entry opening can be provided with a pivotable flap which by means of a spring is pretensioned to a position that closes the entry opening and by way of the push-fitted appendage is pivoted to a position that opens toward the receptacle duct. On account thereof it is possible for the entry opening to always be kept in a closed state as long as no appendage is push-fitted into the entry opening. The flap herein is preferably at an obtuse angle in relation to the open position in order to impede opening of the flap by an item that incidentally falls on the flap.

Attaching the receptacle part in the vehicle can be performed at the most varied of positions. When the appendage is rigidly connected to the mounting, the positioning of the receptacle part also largely determines the positioning and optionally the clarity of the display of the telecommunications apparatus. It is indeed possible for the telecommunications apparatus to be pivotably attached to the appendage by way of a ball mounting, for example, but the location of the telecommunications apparatus is nevertheless determined by the position of the receptacle part. According to the invention, a remedy is provided in that the appendage is part of a holding piece which is configured as a pivotable arm, the free end of the latter having a fastening plate for fastening the mounting. The mounting can thus be releasably attached to the holding piece. By pivoting the arm, the telecommunications apparatus that is held by the mounting can be pivoted to a more favorable position.

This is possible in particular when the pivotable arm has at least three portions and two horizontal rotary joints which are mutually spaced apart, and a vertical rotary joint that is perpendicular to the latter. In this way, the positioning of the apparatus that is held by the mounting can be performed in a wide range, wherein in particular the height is adjustable by a Z-type pivoting of the portions by way of the two horizontal rotary joints, and the alignment of the telecommunications apparatus is adjustable by the vertical rotary joint.

In one advantageous embodiment of the invention, the mounting for receiving different telecommunications apparatuses is provided with adjustable holding arms. The holder system according to the invention thus enables the departure from mountings that are adapted to a special telecommunications apparatus and the use of quasi universal mountings in which telecommunications apparatuses having different dimensions are fastenable. This is advantageous in particular when the mounting has an induction coil in the rear wall of the former and a display which displays a correct positioning of the telecommunications apparatus that is provided for inductive charging in front of the induction charging coil in the case of an adjustment of a holding arm that is configured as a base bracket and carries the telecommunications apparatus. In the case of an inductive charging of the apparatus a galvanic electrical connection between the mounting and the telecommunications apparatus is no longer required. It is therefore only still relevant that the induction charging coil of the mounting is positioned in an optimal manner in relation to the corresponding induction coil of the telecommunications apparatus in order for charging of the telecommunications apparatus in the mounting to be able to be performed with the highest possible efficiency.

Since the charging coils of the telecommunications apparatuses are typically disposed in the central axis, it is preferable for two lateral holding arms to be adjustable only in a conjointly coupled manner, such that telecommunications apparatuses of various readiness are always positionable so as to be centric in front of the rear wall.

The invention is to be explained in more detail hereunder by means of exemplary embodiments that are illustrated in the drawing in which:

FIG. 1 shows a perspective illustration of a housing of a receptacle part;

FIG. 2 shows a longitudinal section through the receptacle part according to FIG. 1;

FIG. 3 shows a perspective view of a receptacle part and of a holding piece having an appendage for push-fitting into a receptacle duct of the receptacle part;

FIGS. 7A-7B shows a partial longitudinal section according to the line A-A in FIG. 6, according to FIG. 7A in the not yet plug-fitted position, and according to FIG. 7B in the plug-fitted position of the appendage in the receptacle duct;

FIG. 8 shows a side view of a mounting having deployed holding arms;

FIG. 9 shows the side view according to FIG. 8, having holding arms retracted to the maximum;

Figure 4:
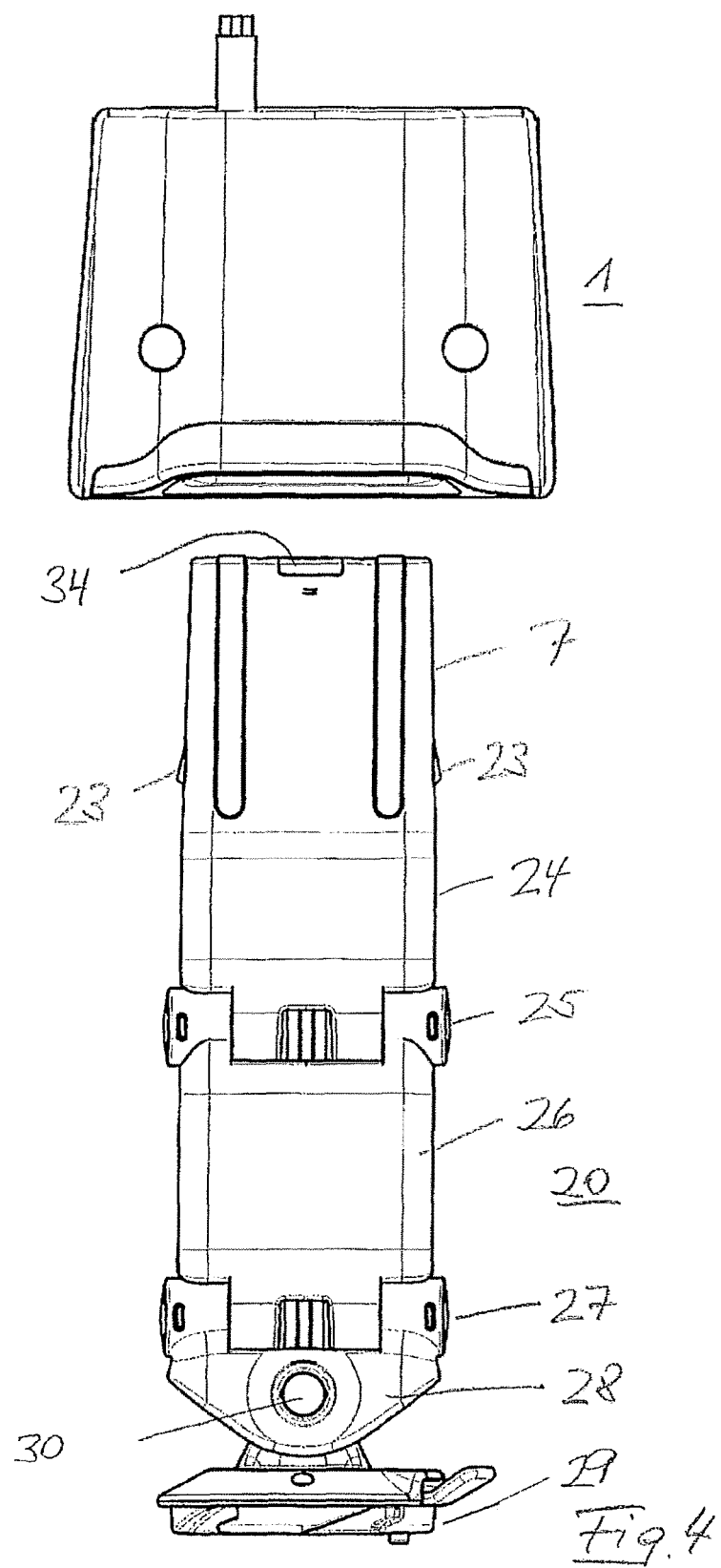
FIG. 4 shows a plan view of the arrangement according to FIG. 3.

FIG. 1 shows a receptacle part which has a housing 2 having a planar lower side 3 and a sculpted, curved upper side 4. The housing 2 is provided with a front end side 5 and a rearward end side 6. As is highlighted in FIG. 2, the rearward end side is closed while the front end side 5 has a slot-shaped entry opening 7, the width of the latter being significantly greater than the height thereof, wherein the width-to-height ratio of the entry opening is greater than 2:1, in particular greater than 2.5:1, and preferably greater than 3:1.

FIGS. 1 and 2 show that the sculpted, curved upper side 4 continuously decreases in height from the front end side 5 to the rear end side 6.

The housing 2 enables an electrical connector cable 8, which in the exemplary embodiment illustrated is configured as a flat cable having three conductors 9, to be routed through at the rearward end side 6. The three conductors can carry the positive pole, the negative pole (ground) and a switching signal "ignition on/off".

The sculpted, curved upper side 4 of the housing 2, from the entry opening 7 laterally across the entire length of the housing, bears directly on the lower side 3 and there is raised toward the center, on account of which the space for the rectangular slot-shaped entry opening 7 is made available in the region of the front end side 5. A receptacle duct 10 which extends from the entry opening 7 toward the rear and which by virtue of the upper side 4 that drops toward the rear is in a corresponding manner continuously reduced in height toward the rear and terminates at an end wall 11 is configured in the interior of the housing. Three contacts 12 which are configured as spring contacts and which in each case are connected to one of the three conductors 9 protrude through the end wall 11. Protrusions 13 which protrude further into the receptacle duct 10 than the spring contacts 12 are located between the contacts 12. It is achieved on account thereof that the contact points 12 cannot be shorted, for example by way of a coin that is dropped or pushed into the receptacle duct 10.

Preferably a plurality of magnets 15 which are preferably permanent magnets and of which only one is illustrated in FIG. 2 are located in a base 14 of the receptacle duct. The permanent magnets in an identical orientation form a magnetic north pole N and a magnetic south pole S which lie sequentially so as to be transverse to the longitudinal direction of the receptacle duct 10 (push-fitting direction), such that the south pole S is disposed so as to point toward the receptacle duct 10, and the north pole N is disposed so as to point away from the receptacle duct 10.

The slot-shaped entry opening 7 by way of a pivotably mounted flap 16 under the action of a spring is pivoted about a rotary bearing 17 to a closed position which is illustrated in FIG. 2. The free end of the flap herein in relation to the base is pivoted by somewhat more than 90° such that the flap 16 and the base 14 enclose an obtuse angle on the internal side of the receptacle duct 10. A narrow object that acts on the flat 16 thus slides down in the direction of the rotary bearing 17 and impedes the opening of the flap 16. In order for the receptacle duct 10 to be opened, the flap 16 has to be pivoted inwardly from the closed position illustrated in FIG. 2 toward the inside of the receptacle duct 10 until the flap comes to lie in a matching clearance 18 of the base 14, thus vacating the receptacle duct 10.

FIG. 3 shows a holding piece 20 which is configured to be received in the receptacle part 1 and which has an appendage 21, the shape of the latter being adapted to the shape of the receptacle duct 10. Accordingly, the appendage 21 in terms of the height thereof tapers continuously such that said appendage is guided in the receptacle duct 10 in a stable manner and by way of tight tolerances.

The appendage 21 has two strips 22 that are inserted into the surface of the former on the upper side. Two corresponding strips 22 are furthermore located on the lower side (not illustrated in FIG. 3). The strips 22 are composed of a textile material, in particular a flocked textile material, and as a scratch protection in the push-fitting movement protrude somewhat beyond the neighboring surface.

In the push-fitting of the appendage 21 into the receptacle duct 10 a secured position results from latching cams 23 which are provided laterally on the appendage and which can latch in a sprung manner into corresponding latching clearances 24 (FIG. 2) of the receptacle duct 10. To this end, the latching cams 23 are usually provided with a sawtooth-like run-on ramp which is adjoined by a latching ramp having a significantly steeper incline. On account thereof, significantly less force is required for pulling the appendage 21 into the latching position than for extracting the appendage 21 from the latching position. The appendage 21 at the free front end thereof has a clearance 34 in which the protrusion 13 that is located between the contact points 12 in the end wall 11 of the receptacle duct 10 is received, such that the appendage 21 by way of end-side contact faces (not illustrated) can contact the contact points 12.

FIGS. 3 and 4 highlight that the appendage 7 is part of a first portion of the holding piece 20. The first portion 24 by way of a first horizontal rotary joint 25 is connected to a second portion 26 of the holding piece 20. Said second portion 26 forms a rigid connection piece and by way of a second horizontal rotary joint 27 is connected to a third portion 28 of the holding piece 20. The three portions 24, 26, 28 of the holding piece 20 thus form an apparatus arm by way of a more or less intense Z-shaped mutual articulation of the portions enables the adjustment at different heights and at variable spacing from the receptacle part 1 when the holding piece 20 is push-fitted into the receptacle part 1.

A fastening plate 29 of circular configuration, by way of a vertical rotary joint 30 that is perpendicular to the axes of the horizontal rotary joints 25, 27, is connected on the third portion 28.

Figure 5:
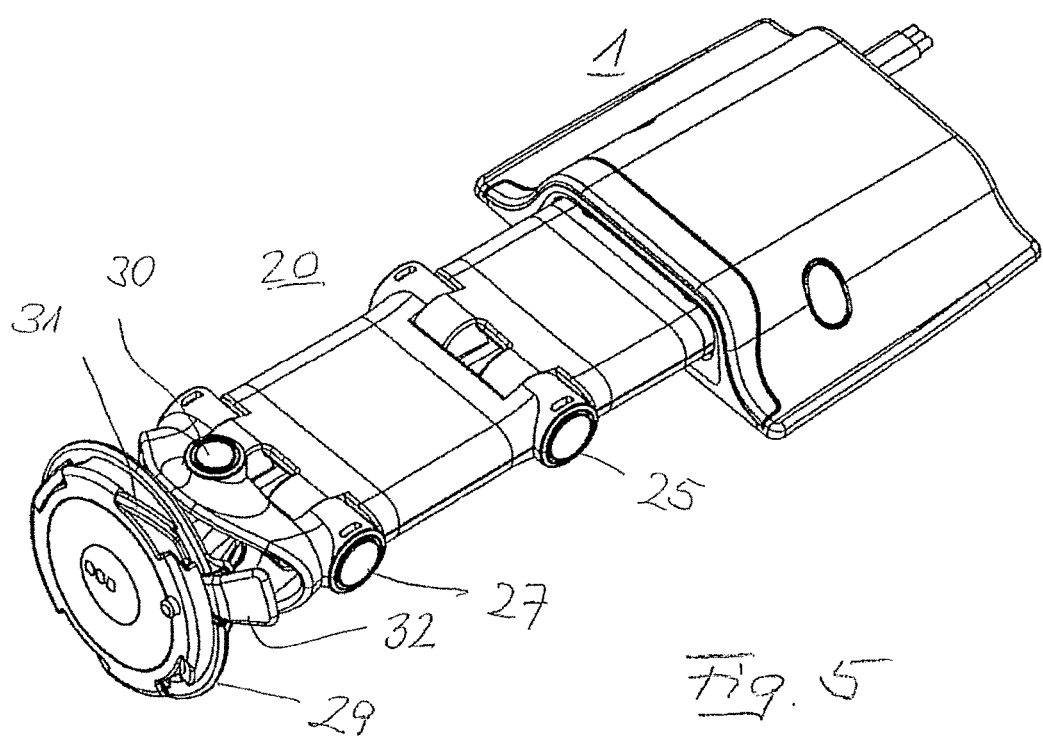
FIG. 5 shows an illustration according to FIG. 3, having the appendage push-fitted into the receptacle duct.

On account thereof, the fastening plate 29 is pivotable about a vertical axis. As can be seen in particular in FIG. 5, the fastening plate 29 is provided with a twist/lock closure. By placing corresponding latching cams in an initial position, said latching cams by way of a rotating movement can run on latching ramps that are disposed in a helical manner and by way of the effect of a sprung plate can be urged to a latching position behind the latching ramp. The contact pressure of the spring can be released with the aid of a lever 32 such that a reverse rotation out of the twist/lock closure 31 is possible.

The electrical potentials are routed through the holding piece 20 by way of the rotary joints 25, 27, and 30, said electrical potentials reaching three contact faces 33 on the fastening plate 29 that are disposed in an asymmetrical manner, as will be explained in more detail hereunder.

Figure 6:
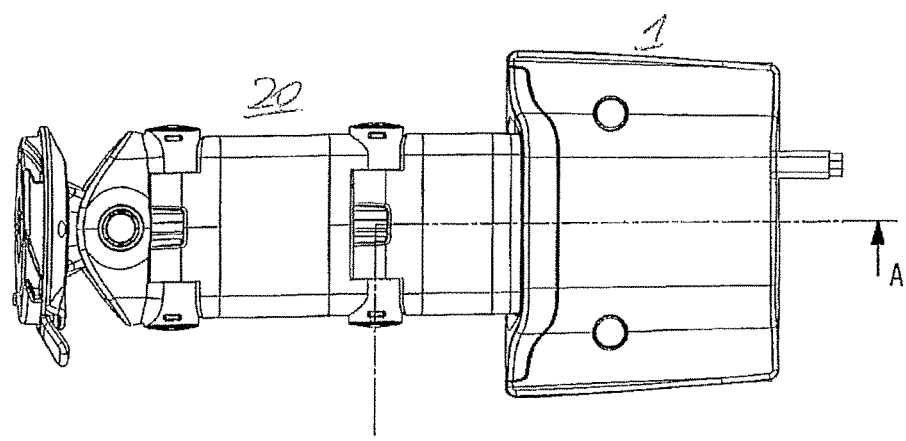
FIG. 6 shows a plan view of the arrangement according to FIG. 5.

FIGS. 6 and 7a and 7b once again highlight the fastening of the holding piece 20 in the receptacle part 1 by push-fitting the appendage 21 into the receptacle duct 10. The flap 16 which has been pushed downward by the appendage can be seen here in FIG. 7b.

It can be seen in FIG. 7 that the magnets 15 that are located in the base 14 of the receptacle duct 10 have a magnetic pole (presently the south pole S) that points toward the receptacle duct 10, and a magnetic pole (presently the north pole N) that points away from the receptacle duct 10. The appendage 21 is provided with corresponding magnets 35 which have an alignment of a north pole N and of a south pole S that likewise runs transversely to the longitudinal axis of the appendage 21.

As is highlighted in FIG. 7b, the magnets 15, 35 interact when the appendage 21 is being push-fitted into the receptacle duct 10. The magnetic poles N, S herein are positioned such that in the completely push-fitted state of the appendage 21 the magnetic pole N of the magnet 35 in the appendage 21 is moved close to the magnetic pole S of the magnet 15 in the base 14 of the receptacle duct 10. On account thereof, the appendage 10 is magnetically pulled into the receptacle duct 10.

By contrast, if the appendage 21 were to be push-fitted into the receptacle duct 10 in an incorrect position rotated by 180°, like poles N and S are noticeably moved closer together, on account of which an increasing counterforce acting against the push-fitting of the appendage 21 into the receptacle duct 10 is created. Therefore, using a normal effort in terms of force, it is not possible for the appendage 21 in the (incorrect) position rotated by 180° to be pushed into the receptacle duct 10 so far that a latching position is reached. By contrast, in the correct alignment of the appendage 21, the appendage 21 by the magnets 15, 35 is pulled into the receptacle duct 10 up to the secured position which results from the interaction between the latching cams 23 and the latching clearances 24 (FIG. 2). The maximum magnetic force is reached when the unlike poles of the magnets 15, 35 are completely aligned with one another, that is to say are in mutual alignment by way of the central axes of said magnets 15, 35. As is highlighted in FIG. 7b, in particular by way of the illustrated enlargement, this position does not have to be precisely reached in practice.

With reference to FIGS. 2 and 3, the rotary joints 25, 27, 30 of the holding piece 20 are configured as self-inhibiting rotary joints in that the latter are provided with plates that can be tensioned in relation to one another. The electrical potentials can be transmitted through the rotary joints by way of the alternating configuration of metallic plates and isolation plates.

Figure 10:
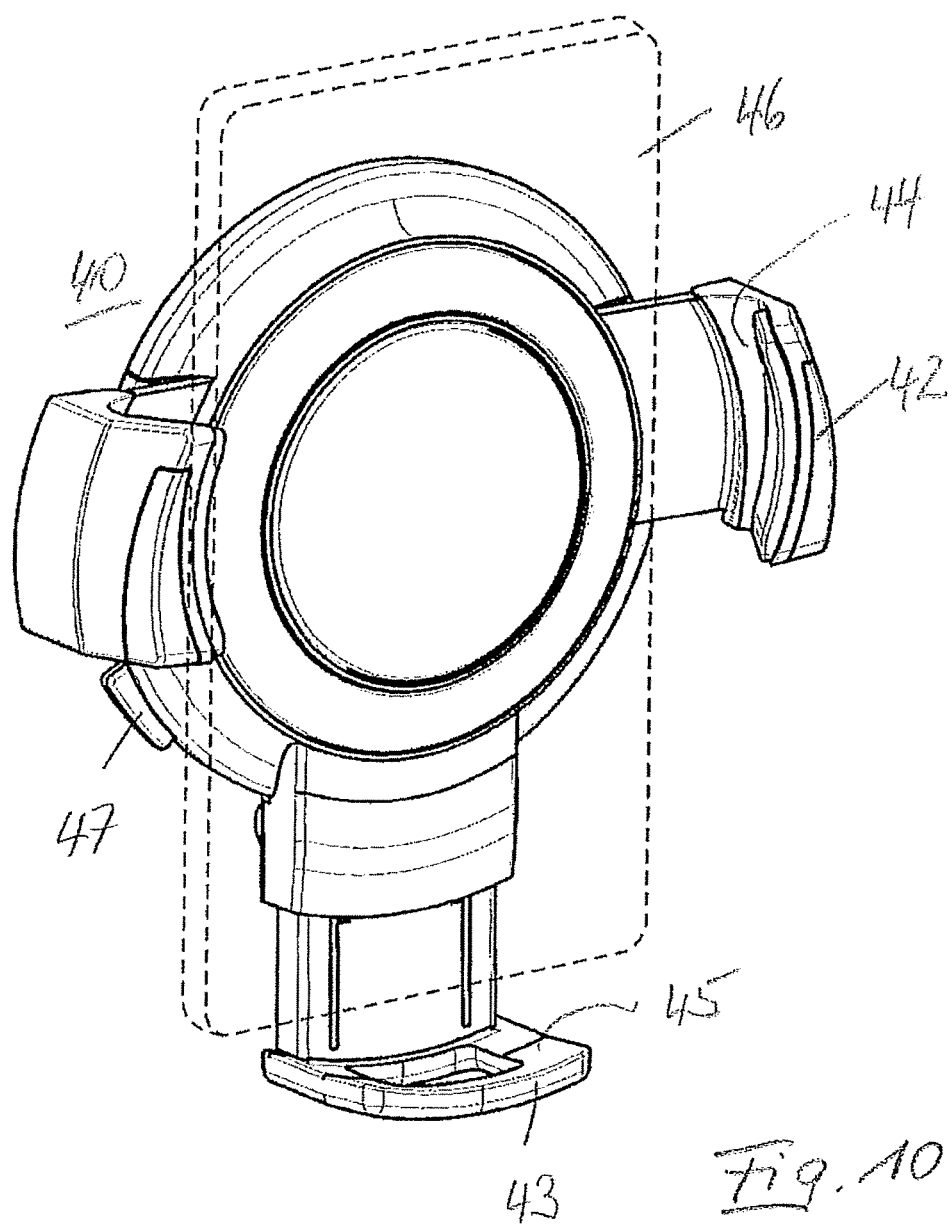
FIG. 10 shows a perspective illustration of the mounting having a telecommunications apparatus indicated with dashed lines.

A mounting 40 is attachable in a latching manner to the fastening plate 29 of the holding piece 20, said mounting being illustrated in FIGS. 8 to 11. The mounting 40 has a circular rear wall 41 that corresponds to the shape of the fastening plate 29, two lateral holding arms 42 extending from said rear wall 41 in lateral direction, and one holding arm 43 configured as a base bracket extending downward from said rear wall 41. The holding arms 42, 43 are provided with clamping jaws 44, 45 which are specified for bearing on a telecommunications apparatus 46 that is configured substantially as a flat cuboid (FIG. 10).

FIG. 8 shows the holding arms 42, 43 in the maximum deployed position thereof; FIG. 9 shows the holding arms 42, 43 in the maximum retracted position thereof.

The holding arms 42, 43, in a manner known per se, from the maximum deployed position in FIG. 8 are adjustable in only one direction. According to FIG. 10, the telecommunications apparatus 46 is inserted into the mounting 40 having the holding arms 42, 43 deployed to the maximum. Thereafter, the holding arm 43 that is configured as a base bracket is displaced upward, that is to say is pulled in toward the rear wall 41, until a suitable position for the telecommunications apparatus 46 has been reached. Thereafter, the lateral holding arms 42 are retracted, wherein the movement of said holding arms 42 is interlinked such that only an adjustment of the lateral holding arms 42 that is symmetrical to the central axis is possible. It is achieved on account thereof that the telecommunications apparatus is always held so as to be symmetrical to the vertical central axis of the fastening plate 29.

The rear wall 41 is provided with a charging induction coil (not illustrated in the drawing) which is actuated by way of the supply voltage when the ignition is switched on. The mounting 40 is consequently specified for the inductive charging of a telecommunications apparatus 46 that is provided therefor. On account of the displacement of the holding arm 43 that is configured as a base bracket, the telecommunications apparatus is displaced in front of the rear wall 41 upward until the electronics located in the rear wall 41 determine a maximum correlation between the charging induction coil located in the rear wall 41 and the coil located in the telecommunications apparatus 46. At this point in time the mounting 40 emits an indicator signal indicating to the user that the optimum position of the telecommunications apparatus 46 in the mounting has now been reached. The indicator signal in the exemplary embodiment illustrated is a visual indicator signal which is generated by an LED in the rear wall. The holding arm 43 that is configured as a base bracket is configured as a light duct and is thus immediately identifiably illuminated when the position of the telecommunications apparatus 46 that is suitable for inductive charging has been reached. Thereafter, the adjustment of the holding arm 43 that is configured as a base bracket should be concluded. The telecommunications apparatus by way of the clamping jaws 44 of the lateral holding arms 42 is subsequently laterally clamped and on account thereof securely held in the mounting 40. Releasing the holding arms 42, 43 is possible by activating an unlocking button 47 which separates a toothed locking feature from the holding arms 42, 43 such that the latter can be returned to the deployed position thereof according to FIG. 8.

Figure 11:
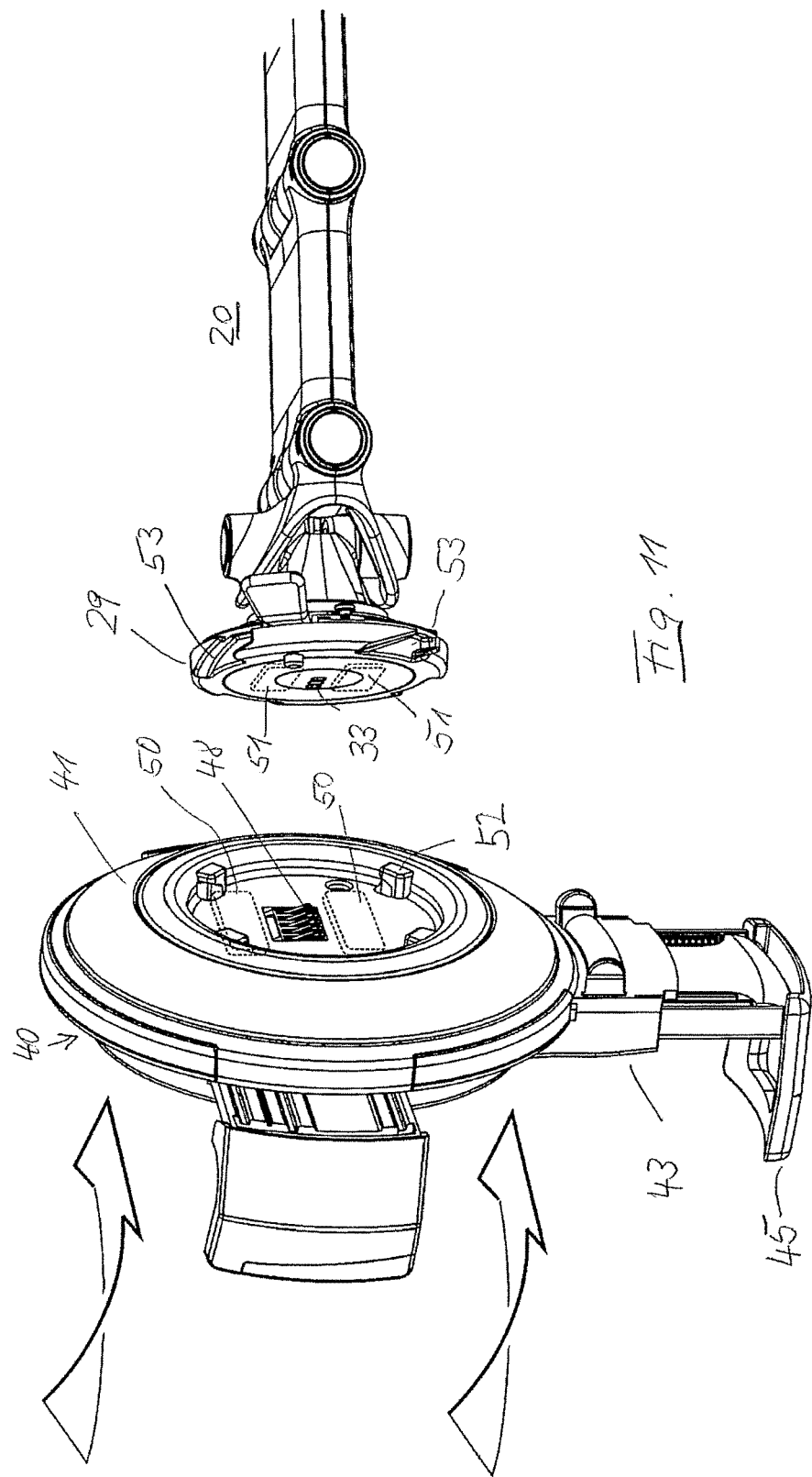
FIG. 11 shows a perspective illustration of the rear side of the mounting and of the fastening plate of the holding piece that points to the rear side of the mounting.

The rear side of the rear wall 41, which is adapted to the shape of the fastening plate 29, can be seen in FIG. 11. Five spring contacts 48 which are disposed in a symmetrical manner are located on the rear side. The central spring contact herein is provided for the ground potential and contacts a centrical contact face 33 of the fastening plate 29. The two spring contacts that are located beside the central spring contact can be connected to the positive pole, for example, while the outer spring contacts can be connected to the "ignition on/off" signal, for example. The mounting 40 in terms of polarity is thus always supplied with the correct electrical signals or potentials, respectively, in both possible connecting positions which differ by 180°.

The mounting is thus also capable of being locked to the fastening plate with the holding arm 43 that forms the base bracket facing upward, should this be required by the installation situation.

By virtue of the holding piece 20, the telecommunications apparatus 46 that is held in the mounting 40 can be held at different heights, spacings, and lateral inclinations, such that the position that is optimal to a viewer is adjustable.

Indicated in the illustration of FIG. 11 are permanent magnets 50 in the rear wall 41 of the mounting 40, as well as permanent magnets 51 in the fastening plate 29 of the holding piece 20. The mutual position of the holder 40 and of the holding piece 20 illustrated corresponds to the locked, that is to say assembled position in which the permanent magnets 50 and 51 are in each case opposite one another. The permanent magnets 50, 51 in the exemplary embodiment illustrated are configured as rectangular plates which are magnetized such that the north pole and the south pole, respectively, are present on the large faces of said plates. The magnets herein are located on the same radius about the rotation axis of the rotating movement by way of which the mounting 40 is securable on the holding piece 20. To this end, four L-shaped appendages 52 are molded on the rear side 41 of the mounting 40, said appendages 52 in an initial position being introducible into corresponding ramp guides 53 of the fastening plate 29, and by way of the ramp being movable to a latching position by way of a rotating movement about the rotation axis that is perpendicular to the rear wall 41.

Figure 12:
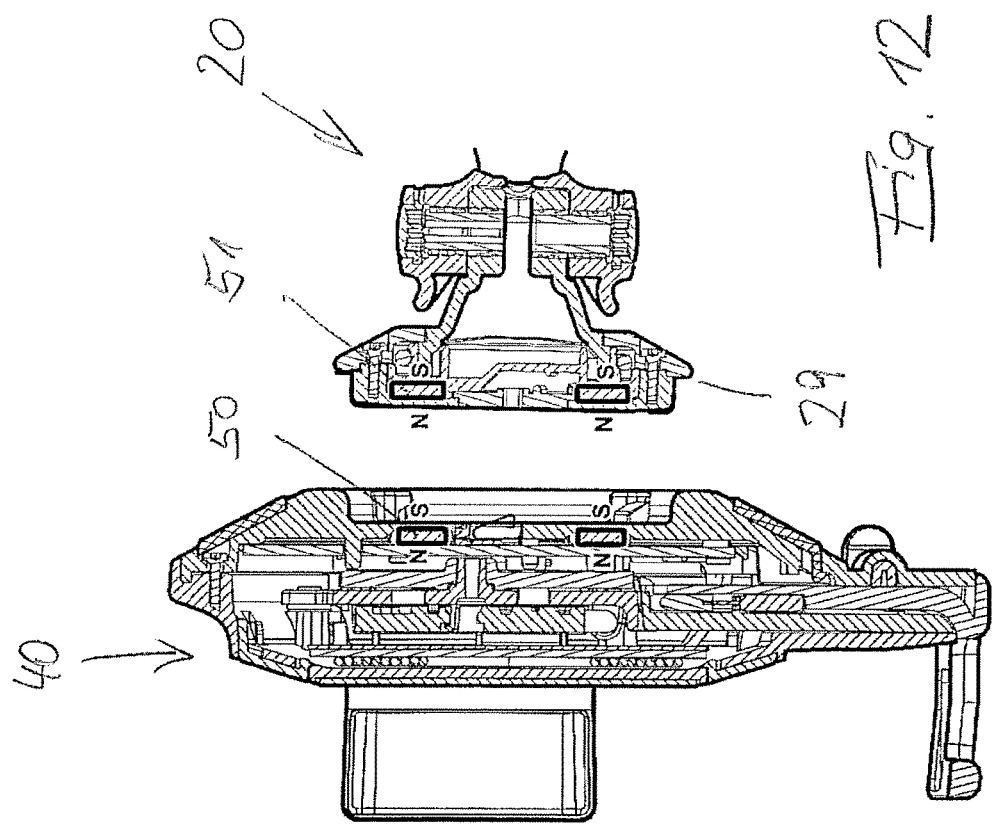
FIG. 12 shows a section through the mounting and of an end portion of the holding piece having the fastening plate, in order to highlight the position of inserted permanent magnets.

FIG. 12 in a sectional illustration highlights that in the latching position illustrated the permanent magnets 50 and 51 in each case by way of unlike poles N, S point toward one another. The permanent magnets 50, 51 in the initial position are mutually spaced apart in the circumferential direction, exerting a considerable attracting force by way of which the holder 40 is pulled to the correct position relative to the fastening plate 29 of the holding piece 20.

Figure 13:
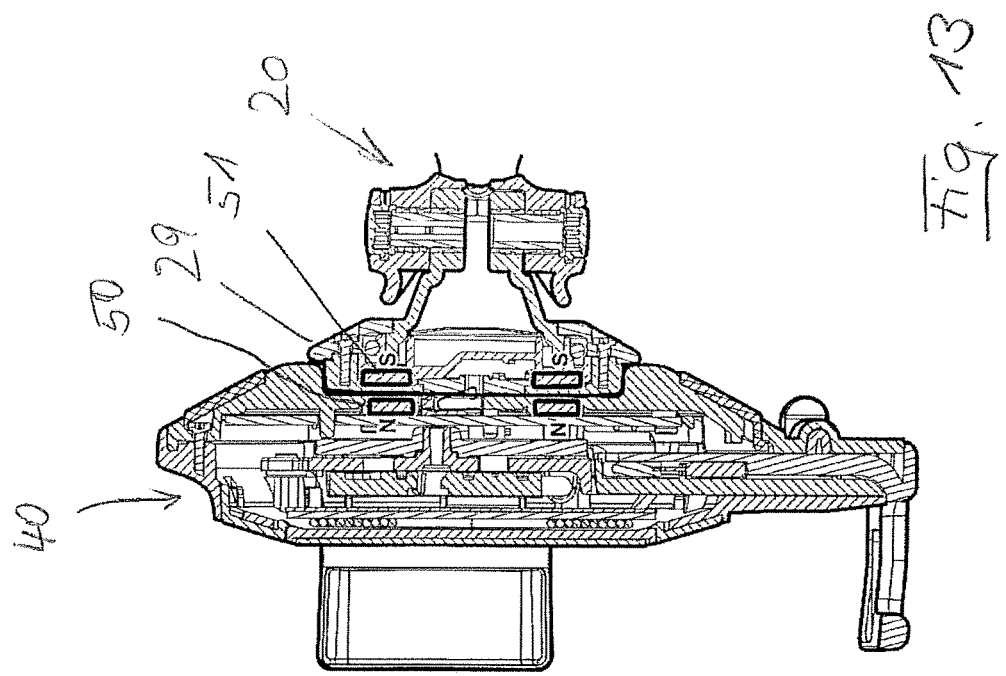
FIG. 13 shows the arrangement according to FIG. 12 in an assembled state.

FIG. 13 shows the final assembled state of the latching position.

The invention claimed is:

1. A holder system for an electronic apparatus, comprising:
   a holding piece for fastening in a locationally fixed manner, wherein the holding piece has a fastening plate;
   a mounting that is connectable to the holding piece and to which the electronic apparatus is releasably fastenable, wherein the mounting has a rear wall;
   fastening elements on the fastening plate of the holding piece, and on the rear wall of the mounting, which by a rotating movement of less than 180° are conjointly movable from an initial position to a mechanically latched position, wherein the fastening elements secure the mounting in the mechanically latched position and
   magnets or ferromagnetic pieces inserted into the fastening plate on the one hand, and into the rear wall on the other hand, such that an increasing magnetic pull is present from the initial position to the mechanically latched position.

2. The holder system according to claim 1 wherein the magnets or ferromagnetic pieces include in each case two permanent magnets inserted into the rear wall of the mounting as well as into the fastening plate of the holding piece such that said permanent magnets in the mechanically latched position are in each case opposite one another.

3. The holder system according to claim 1 wherein either of the fastening elements is configured as a bayonet guide for the rotating movement between the mounting and the holding piece.

4. The holder system of claim 1 wherein one or more of the fastening elements include a ramp guide.

* * * * *